Figure 1:
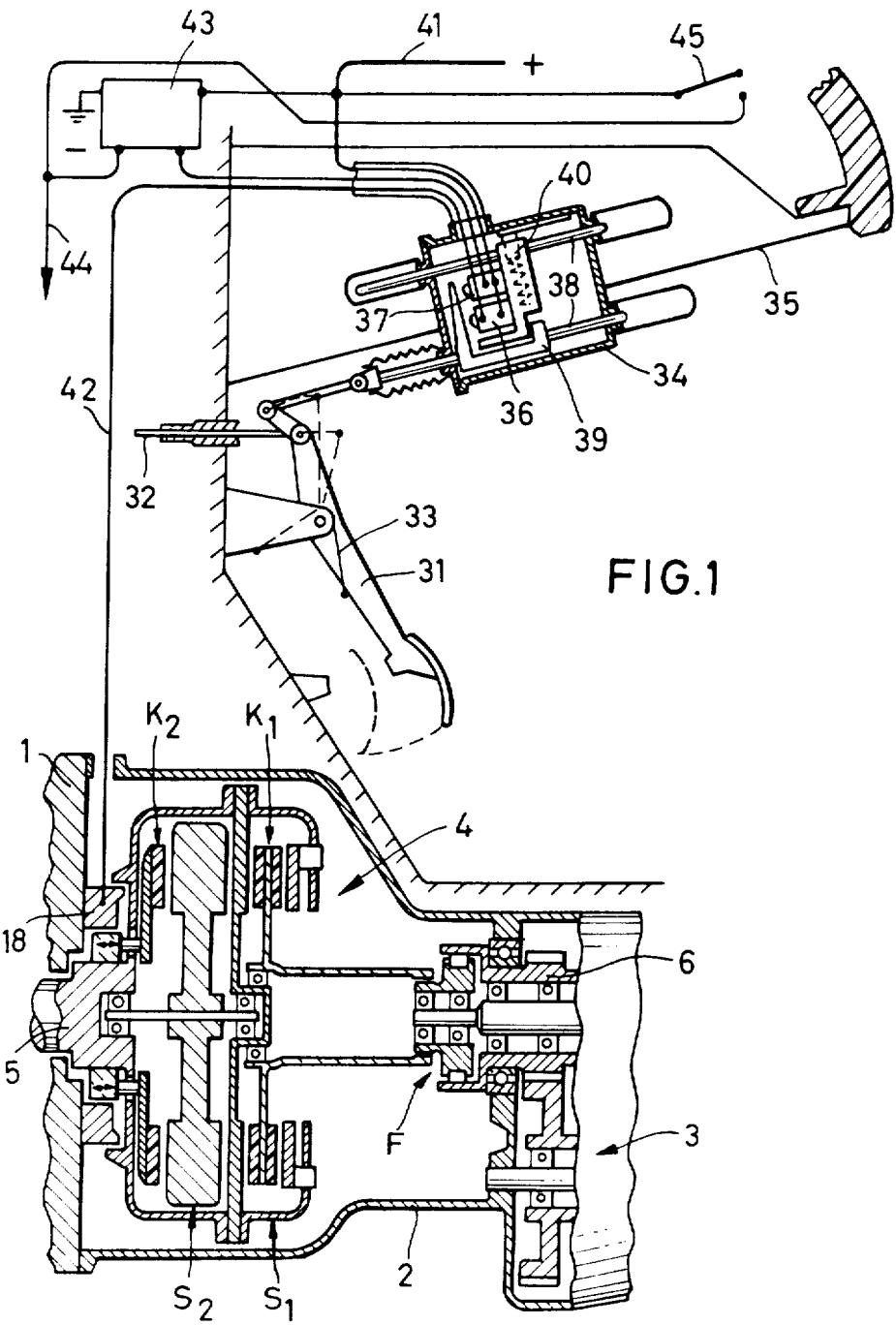

United States Patent [19]

Kaniut

[11] 4,372,262
[45] Feb. 8, 1983

[54] STOPPING AND RESTARTING DEVICE FOR THE INTERNAL COMBUSTION ENGINE OF A MOTOR VEHICLE

[75] Inventor: Herbert Kaniut, Cologne, Fed. Rep. of Germany

[73] Assignee: Ford Motor Company, Dearborn, Mich.

[21] Appl. No.: 304,473

[22] Filed: Sep. 22, 1981

[51] Int. Cl.³ .................................................. F02N 17/00
[52] U.S. Cl. ..................... 123/179 J; 123/179 A; 123/179 BG; 192/84 A; 192/84 AA; 74/7 C
[58] Field of Search ............ 123/179 J, 179 A, 179 B, 123/179 BG, 179 G; 192/84 A, 84 AA; 74/7 C, 6

[56] References Cited

U.S. PATENT DOCUMENTS

| 2,068,463 | 1/1937 | Nardone | 123/179 J |
| 2,301,440 | 11/1942 | Nardone | 123/179 J |
| 3,882,950 | 5/1975 | Strohlein | 123/179 J |

FOREIGN PATENT DOCUMENTS

| 124944 | 10/1931 | Austria | 123/179 J |
| 1575760 | 1/1970 | Fed. Rep. of Germany | 192/84 AA |
| 2617410 | 3/1977 | Fed. Rep. of Germany | 123/179 BG |
| 3023277 | 1/1982 | Fed. Rep. of Germany | 123/179 J |

OTHER PUBLICATIONS

"Automobilerevue", No. 23, May 29, 1980, p. 45.
"Auto-Motor-und Sport", No. 23, Nov. 7, 1979, pp. 44–46.

Primary Examiner—P. S. Lall
Attorney, Agent, or Firm—Robert E. McCollum; Clifford L. Sadler

[57] ABSTRACT

An apparatus for stopping and restarting a motor vehicle by means of a flywheel alternately clutched to the engine crankshaft to be driven thereby or declutched to rotate freely for subsequent driving of the engine to restart the engine, the engine being shut off in response to release of the accelerator pedal deactivating switches controlling the clutch mechanism after a predetermined time delay longer than the time normally required for a gear shift change.

5 Claims, 2 Drawing Figures

STOPPING AND RESTARTING DEVICE FOR THE INTERNAL COMBUSTION ENGINE OF A MOTOR VEHICLE

This invention relates in general to an apparatus for stopping and restarting a motor vehicle type engine to conserve fuel while operating a vehicle under city type traffic conditions. This type of apparatus is known in general from articles such as "Auto-Motor-und Sport", No. 23, Nov. 7, 1979, pages 44–46; and "Automobilerevue", No. 23, of May 29, 1980 at page 45.

This invention relates more particularly to such an apparatus that performs the desired functions by the use of an inertia flywheel having rotational energy stored therein.

The literature referred to above shows schematically a first starting and gear shift coupling or clutch that connects a freely pivoted flywheel and the vehicle gear change mechanism, while a second flywheel coupling or clutch connects the internal combustion engine and the freely pivoted flywheel. Provision is made to control both couplings by means of vacuum activated servo-devices. The freely pivoted flywheel also is provided with a starter gear rim for the conventional electro starter.

The prior art device operates to switch off the engine of the vehicle automatically during stops due to traffic and to restart it quickly and easily merely by depressing the accelerator pedal, which then utilizes the energy stored in the still running flywheel. For this purpose, a sequential control of the two servo-activated couplings is necessary.

This above described known stopping and starting device for the internal combustion engine of a motor vehicle has the disadvantage that its construction is relatively expensive in terms of cost and effort and it requires an expensive control system. Furthermore, as far as can be deduced from the schematic diagrams, a failure of the servo-power could lead to a breakdown of the vehicle.

It is an object of this invention to provide an improved stopping and starting device that is less expensive to manufacture than the known devices, and one whose function is assured even in the event of the failure of the servo-power.

This object is accomplished by providing a construction in which the starting and/or gear shift coupling or clutch is disposed between a first flywheel mass connected firmly with the crankshaft of the internal combustion engine and a freewheel or overrunning device disposed on the gearbox primary shaft, and a second servo-activated flywheel coupling or clutch is disposed between the first flywheel mass and a second flywheel mass freely pivoted within the first flywheel mass. A costly control system for controlling the operation of the servo-operated starting and gear shift coupling is unnecessary, and the vehicle also can continue to be used normally even in the event of failure of the servo-power.

By the separation of the two flywheel masses according to the invention, the advantage is achieved that during a normal gear change with the aid of the gear change coupling, only the smaller mass of the first flywheel mass S1 must be accelerated and takes place after the gear change process largely through the kinetic energy of the second flywheel mass S2, which also saves fuel during the gear change. Since only after engagement of the gear shift coupling and depression of the accelerator pedal is the flywheel coupling or first flywheel mass also engaged, the internal combustion engine works during its normal operation with an increased flywheel mass which contributes to quieter engine running.

The servo-activated second flywheel mass coupling preferably can take the form of an electro-magnetic clutch, but it is of course possible to use at this point another form of servo-activated coupling, such as, for example, a pneumatic or hydraulically activated coupling.

The starting and gear shift coupling or clutch to the first flywheel mass is preferably in the form of a basically conventional friction disc coupling insofar as it interacts with a flywheel overrunning device and a conventional gear change mechanism.

Preferably the starting coupling can, however, also take the form of a basically conventional hydraulic coupling or a hydrokinetic torque converter if an infinitely variable traction roller or planetary gear is used. The automatic release function of the hydraulic coupling or the hydrokinetic torque converter in the sliding operation here makes it possible to have its own freewheel device.

It is, therefore, a primary object of the invention to provide a stopping and restarting apparatus including switching apparatus that will be responsive to the movement of the vehicle accelerator pedal to automatically engage the engine crankshaft with a flywheel mass to drive the same during normal engine operation; to disconnect the flywheel from the engine during a gear-shift change or during vehicle coasting operation so that the engine can be shut off; and restart the engine by reengaging the crankshaft with the rotating flywheel when acceleration of the vehicle again is desired.

Figure 2:
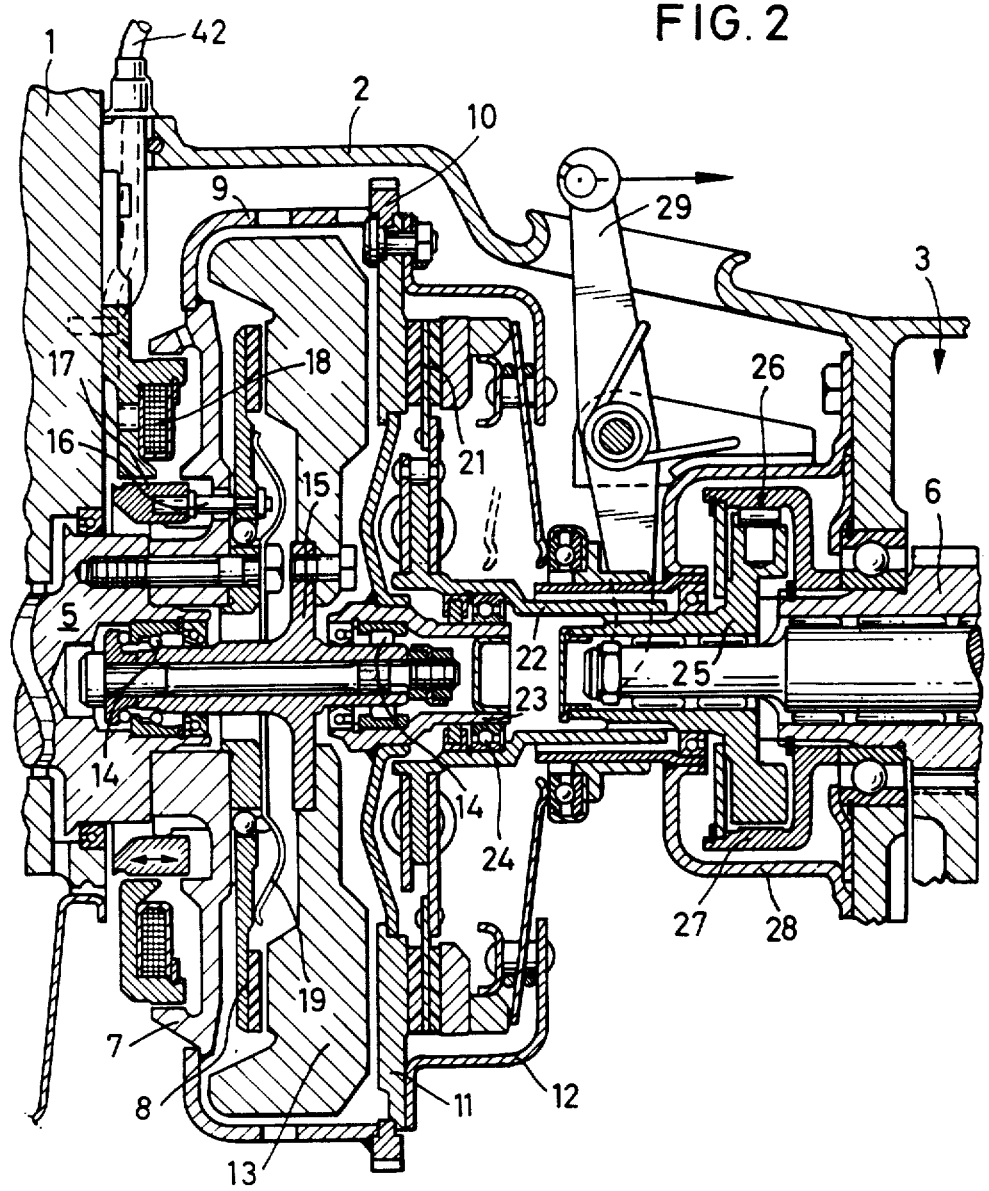

Other objects, features and advantages of the invention will become more apparent upon reference to the succeeding detailed description thereof, and to the drawings illustrating the preferred embodiment thereof; wherein, FIG. 1 is a schematic representation of a stopping and starting apparatus constructed according to the invention and, FIG. 2 shows a cross-sectional view through a more detailed design embodiment of the mechanical coupling arrangement.

In FIG. 1, the engine block 1 of an internal combustion engine is connected via a gear housing 2 with a gear change mechanism 3. Within gear housing 2 is disposed the mechanical coupling arrangement 4 between the engine crankshaft 5 and the primary input shaft 6 of the gear change mechanism. The mechanical coupling arrangement 4 consists basically of an outer shell or first flywheel mass S1 which is firmly connected with the crankshaft 5, and a second flywheel mass S2 which is freely pivoted within first flywheel mass S1. The coupling arrangement 4 also consists of a starting and/or gear shift coupling or clutch K1, that connects the first flywheel mass S1 to the gearbox primary input shaft 6 through a freewheel device F. It also consists of a servo-activated flywheel coupling or clutch K2 which is disposed between the first flywheel mass S1 and the second flywheel mass S2.

In this case, the servo-activated coupling K2 is in the form of an electromagnetic coupling or clutch which is activated by means of an electric control system to be described later.

In order to explain the mechanical coupling arrangement 4 in greater detail, its structure is now described in association with FIG. 2.

The shell or flywheel mass S1 consists of a hub 7 that is connected to the engine crankshaft 5 and mounts a servo-activated axially movable flywheel friction disc coupling 8 (K2). A key 9 extends from hub 7 and has a starter gear rim 10 connected to a cover plate 11 and the rotating part 12 of the starting and gearshift coupling or clutch K1. The second flywheel mass K2 consists of a solid flywheel 13 of substantial mass enclosed within the key 9 with its hub 15 freely pivoted at one end in the crankshaft 5 and at the other end in cover plate 11 via roller bearings 14. The mounting of the hub 15 on roller bearings 14 assures the freest possible rotation of the flywheel 13, but also absorbs axial forces when the flywheel coupling or clutch K2 is engaged.

The servo-activated flywheel coupling or clutch K2 is in the form of an electromagnetic coupling. The movable friction disc 8 is connected by means of pressure pins 16 with a ring armature 17, which lies in the air gap of a circular electromagnet 18 fixed on the engine block 1. As soon as the electromagnet 18 is activated, it presses the friction disc 8 against the bias of a release spring 19 into frictional engagement with the flywheel 13.

The starting and gear shift coupling or clutch K1 is in the form of a basically conventional friction disc coupling. The friction disc 21 is disposed on a hollow clutch hub 22 which is slidably mounted at one end on a projection 23 on cover plate 11 by means of a roller bearing 24. The other end of the clutch hub 22 is connected with the inner ring (25) of a freewheel or overrunning device F in the form of a grip-roller freewheel 26. The outer ring 27 of the freewheel 26 is here connected with the gearbox primary input shaft 6 and the whole freewheel 26 is preferably disposed within clutch housing 2 in a freewheel housing 28 connected with the oil chamber of the gear change mechanism 3.

The activation of the starting and gear-shift coupling or clutch K1 is effected in a conventional manner by means of a clutch release bearing - withdrawal lever arrangement 29.

The mode of operation of the stopping and starting device for the internal combustion engine of a motor vehicle according to the invention will now be explained with reference to FIGS. 1 and 2.

The electrical control system indicated in FIG. 1 will be explained first. The accelerator pedal 31 of the motor vehicle in a known manner moves the throttle valve of the internal combustion engine by means of a Bowden control cable 32, and is kept in a specified rest or closed throttle positon by a return spring, not shown. The pedal is connected by the mechanical linkage indicated with a switching control apparatus 34 which, for example, can be fixed on the underside of the dashboard 35 of the motor vehicle.

The switching control apparatus 34 includes a switch 36 to control energization of a switching circuit 42 connected to the electromagnetic coupling 18, and a switch 37 to control energization of a switching circuit 44 for the ignition and/or the fuel feed to the internal combustion engine. The two switches 36 and 37 are shown slidably mounted within the switching control apparatus 34 on switch guide rods 38 by means of a switch pole return piece 39 and a switch support 40. The switch pole return piece 39 is constructed so that when the accelerator pedal 31 is depressed, the pole piece 39 moves to close the contacts of the two switches 36 and 37, whereupon further depression of the accelerator pedal moves the switches with the switch support 40 together along the switch guides 38. The switch support 40 makes continuous contact with the positive wire 41 which comes from the conventional ignition lock of the motor vehicle. A further time delay switch 43 and a movable selector switch 45 are inserted into the circuit 44 that energizes the ignition and/or the fuel feed of the internal combustion engine.

We shall now consider the operation of the stopping and starting device. We start from the assumption that the internal combustion engine of the motor vehicle was started in conventional manner by means of the electrostarter (not shown) and the motor vehicle is in motion. As soon as the driver of the vehicle wants to reduce speed, he will release the accelerator pedal 31. Because of this, the switches 36 and 37 that were activated or closed when the accelerator pedal 31 was depressed, are now opened and thus the switching circuit 42 to the electromagnetic coupling K2 is broken or disconnected. This releases clutch K2, permitting the second flywheel mass S2 to continue to rotate freely at the original speed, while the rotational speed of the internal combustion engine and the vehicle will decrease. The circuit 44 for the ignition and/or the fuel feed of the internal combustion engine is at first not yet interrupted since the time delay switch 43 maintains the circuit uninterrupted for a specified time. The delay of the time switch 43 is here preferably adjustable and is set so that the ignition or the fuel feed will not be switched off during short time-spans such as are required for a normal gear change. It could be that the driver has only released the accelerator pedal because he wanted to carry out a normal gear change with the starting and gear shift coupling K1. As soon as he again depresses the accelerator pedal after completing a gear change, the electromagnetic coupling K2 will be reengaged.

However, if the release of the accelerator pedal 31 was due to anything other than a gear change, requiring a longer time span than the time span set by switch 43, then the time switch 43 will interrupt the circuit 44 and with it the ignition and/or the fuel feed to the internal combustion engine. The motor vehicle again thus continues moving with a stopped engine, a released electromagnetic coupling K2, with the starting and gear shift coupling K1 still engaged, whereby the freewheel or overrunning device F assures that the moving vehicle will not drive the engine. The vehicle will thus not use any fuel when traveling down a gradient with the accelerator pedal released and with the engine switched off.

If the driver now wishes to again increase speed, he then only has to depress the accelerator pedal 31 whereby the electromagnetic coupling K2 is again engaged and the ignition and/or the fuel feed for the internal combustion engine is re-established. The engine then will be started without difficulty by the momentum of the flywheel mass S2, which is still rotating at the original speed, during the crankshaft at the same speed.

However, if the driver reduces speed by braking to the extent that the vehicle comes to a halt, as, for example, at a traffic light, then he will disengage the starting and gear shift coupling K2 in the accustomed manner shortly before the vehicle comes to a halt and the car will be in neutral. The engine is now automatically switched off and uses no fuel. As soon as the driver wants to again continue his journey, he will disengage the starting coupling K1 in the customary manner, put it in gear, and depress the accelerator pedal. At this moment, the electromagnetic coupling K2 will immediately be engaged and the internal combustion engine will be started by the rotating flywheel mass S2. The time-span normally required for the gentle engagement of the starting coupling K1 will be sufficient for starting the internal combustion engine.

The driver can thus continue his journey without delay. The stopping and starting device according to the invention has the advantage that the driver can otherwise operate his vehicle completely in the accustomed manner since the switch 45 permits the driver to bypass the switching arrangement so that the engine ignition circuit and fuel-feed to the engine can be maintained even though the accelerator pedal position calls for such an interruption.

While the invention has been described and shown in its preferred embodiment, it will be clear to those skilled in the arts to which it pertains that many changes and modifications may be made thereto without departing from the scope of the invention.

I claim:

1. Apparatus for stopping and restarting the engine of a motor vehicle in response to movement of the vehicle accelerator pedal to and from a closed engine throttle position, including, a freely rotatable flywheel, a first friction clutch means driven by the engine and movable into frictional engagement with the flywheel for the drive thereof, a second friction clutch means for connecting the engine to the vehicle gearing, first electrically operated servo means for engaging the first clutch means, second servo means for engaging the second clutch means, an electrical circuit including switch means movable between a first position establishing the engine ignition circuit and supplying fuel to the engine and energizing the first servo means to drive the flywheel from the engine and movable to a second position interrupting the ignition circuit and the fuel flow to the engine and deenergizing the first servo means thereby permitting a free rotation of the flywheel, means operatively connecting the vehicle accelerator pedal and the switch means for moving the switch means from the first position to the second position in response to release of the accelerator pedal to a closed engine throttle position to shut off the engine and movable back to the first position in response to depression of the accelerator pedal to reenergize the first servo means to reconnect the flywheel and engine crankshaft to thereby provide a drive and restart of the engine by the flywheel, and time delay means in the electrical circuit operable upon release of the accelerator pedal to delay interruption of the ignition circuit and interruption of the fuel supply for a predetermined time period.

2. Apparatus as in claim 1, the switch means including a slidable switch support movable by the accelerator pedal, a switch having a lost motion relative engagement with the switch support to provide closure of the switch contacts to establish an electrical circuit upon movement of the switch support in one direction relative to the switch and opening of the contacts to deenergize the circuit upon movement of the support relative to the switch in the opposite direction.

3. An apparatus as in claim 2, the electrically operated servo means including a connection to the switch means by-passing the time delay means.

4. An apparatus as in claim 2, including means to override the time delay means to maintain the ignition circuit and fuel feed to the engine regardless of the position of the accelerator pedal.

5. An apparatus as in claim 1, the first clutch means including an electromagnetically operated clutch servo movably connected with a friction disk rotatable with the engine crankshaft, and an electrical connection to the switch means by-passing the time delay means.

* * * * *